United States Patent [19]

Street

[11] Patent Number: 4,692,792
[45] Date of Patent: Sep. 8, 1987

[54] METHOD AND APPARATUS FOR PRODUCING STEREOSCOPIC IMAGES

[75] Inventor: Graham S. B. Street, Reading, England

[73] Assignee: Brightad Limited, United Kingdom

[21] Appl. No.: 939,059

[22] Filed: Dec. 8, 1986

Related U.S. Application Data

[63] Continuation of Ser. No. 638,414, Aug. 7, 1984, Pat. No. 4,641,178.

[30] Foreign Application Priority Data

Aug. 12, 1983 [GB] United Kingdom ................. 8231727

[51] Int. Cl.$^4$ ............................................ H04N 15/00
[52] U.S. Cl. .......................................... 358/3; 358/88
[58] Field of Search ................... 358/3, 88, 90, 91, 92; 350/130, 132, 135; 352/57, 59, 60, 62, 63; 354/112, 115

[56] References Cited

U.S. PATENT DOCUMENTS

| | | | |
|---|---|---|---|
| 2,508,920 | 9/1950 | Kell | 358/3 |
| 2,689,879 | 9/1954 | Rehorn | 358/3 |
| 3,569,988 | 3/1971 | Schmidt | 358/3 |
| 3,894,182 | 7/1975 | Yamamoto | 358/63 |
| 4,217,602 | 8/1980 | Thomas | 358/3 |
| 4,431,265 | 2/1984 | Benton | 358/3 |
| 4,480,263 | 10/1984 | VanMerode | 358/3 |
| 4,641,178 | 2/1987 | Street | 358/3 |

Primary Examiner—Michael A. Masinick
Attorney, Agent, or Firm—Lerner, David, Littenberg, Krumholz & Mentlik

[57] ABSTRACT

Stereoscopic apparatus is described in which the spectral components of each perspective of the image are supplied in sequence and in such a way that whilst the left eye is receiving one spectral component of one of the perspectives, the right eye receives the other spectral component of the other perspective, and in alternating periods the left eye receives the other spectral component of its perspective whilst the right eye receives the first spectral component of its perspective. Various means for producing the image and for viewing the two perspectives are illustrated.

5 Claims, 15 Drawing Figures

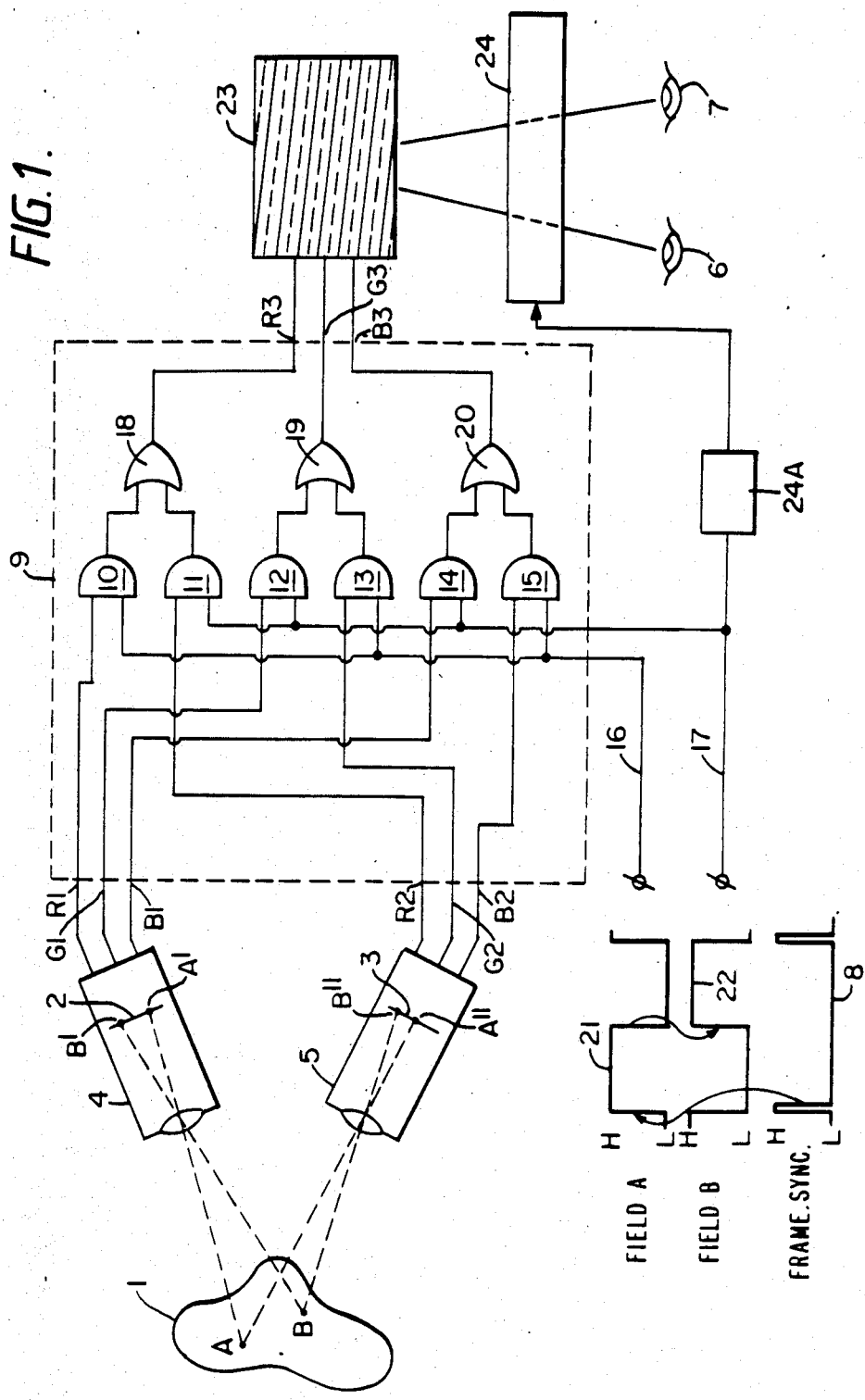

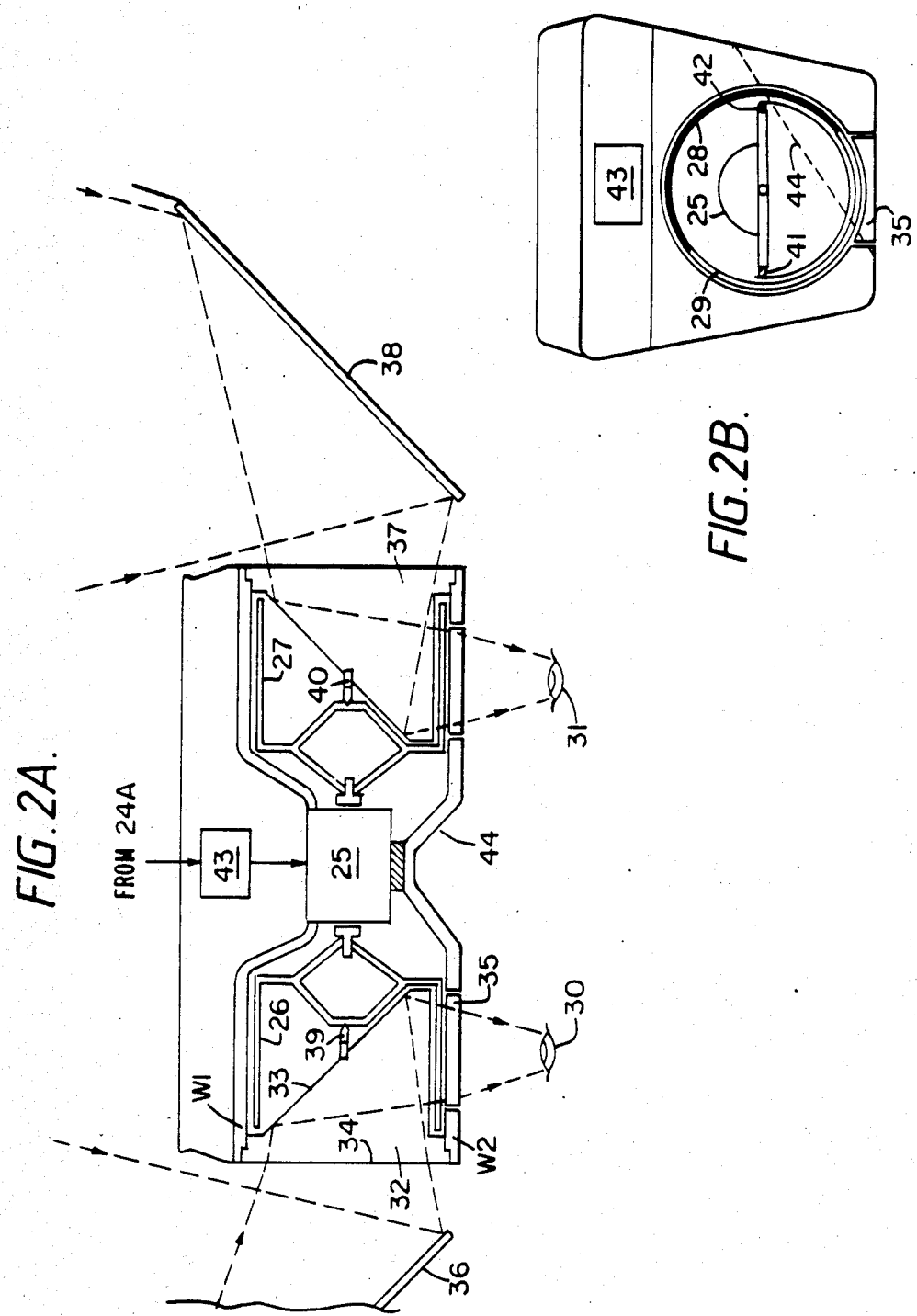

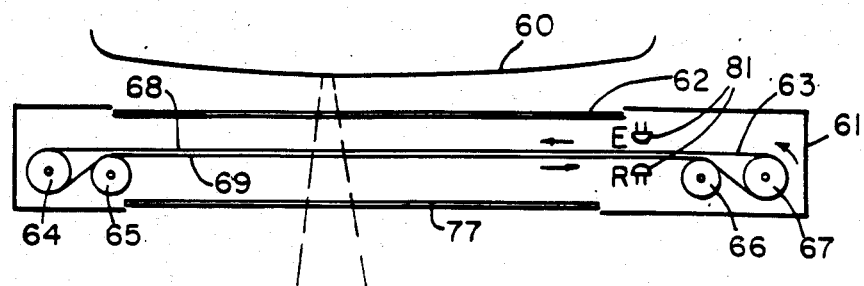
FIG.4A.
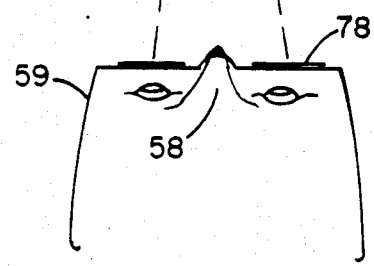
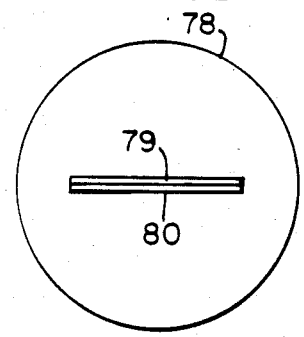
FIG.4D.
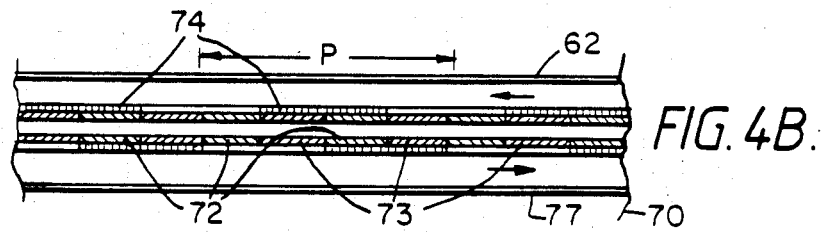
FIG.4B.
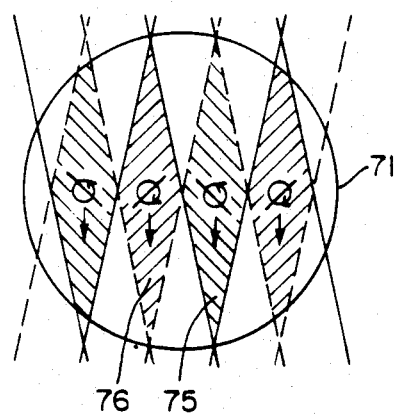
FIG.4C.

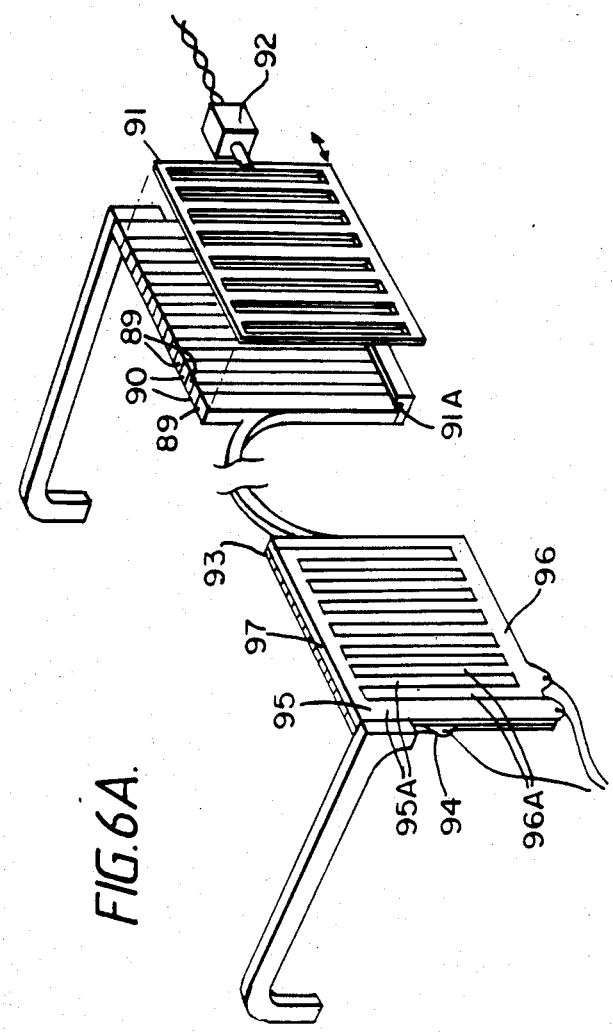
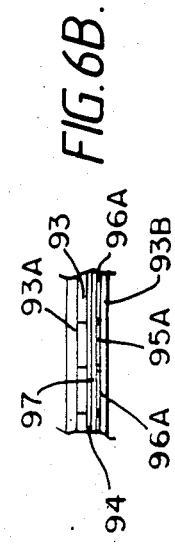
FIG.6A.
FIG.6B.

METHOD AND APPARATUS FOR PRODUCING STEREOSCOPIC IMAGES

This is a continuation of application Ser. No. 638,414, field Aug. 7, 1984 now U.S. Pat. No. 4,641,178.

BACKGROUND OF THE INVENTION

The present invention relates to a method and apparatus for producing stereoscopic images.

The principle of stereoscopic vision is well understood. At the most basic level, each of the viewer's two eyes must perceive the subject matter to be viewed from a slightly different perspective. That is to say that, although the differences are generally quite subtle, each eye receives a different image.

Several methods are commonly used to produce stereoscopic images. On the one hand these include the use of direction selective screens onto which two or more images may be projected simultaneously. Depending on the viewer's position, a different image may be observed by each eye. Where only two images are required, it is common practice to use polarising techniques. Each image is projected with a characteristic polarisation and when viewing through complementary polarising viewing spectacles, each eye only sees the picture intended for its reception.

In television systems, it is possible to use projection techniques together with two or more complete display channels, typically one or more electronic display such as a Cathode Ray Tube (CRT) for each perspective to be displayed. However these systems tend to be costly because of the large amount of equipment needed. There may also be difficulty in obtaining proper alignment of the total system. In order to overcome the need for more than one image creation surface such as the phosphor coated screen of a colour CRT, anaglyph techniques have been used with some modest success. The anaglyph system, as practised in the current art, depends on the use of complementary colour filters placed in front of each eye. For example a red transmitting filter may be used for the left eye, and a blue and green transmitting filter used for the right eye. After each eye has become accustomed to the particular colour bias, and by displaying the left hand perspective of the subject in red and the right hand perspective in blue-green, a reasonable stereoscopic image may be observed. However, because each eye is observing a very restricted portion of the full colour spectrum, only limited colour information can be added to what generally appears as a lightly tinted picture.

A further proposal which has been made in the prior art is to produce on a screen full colour images of the left and right perspectives alternately. The screen is viewed through spectacles which permit each eye to receive only the image of the appropriate perspective. This system is described in, for example, U.S. Pat. Nos. 3,621,127 (Hope) and 4,021,846 (Roese) and in UK Pat. No. 1523436 (Mears). The problem with this system is that substantial flicker is produced because the image received by each eye alternates with periods of darkness.

OBJECT OF THE INVENTION

An object of the invention is to provide a method and apparatus for producing a stereoscopic image in which the viewer is provided with an image which may include a substantially full range of colour information for each eye substantially without flicker. Another object of the invention is to provide such an apparatus which, at least in certain forms, may be produced at relatively low cost.

SUMMARY OF THE INVENTION

The invention provides in one embodiment apparatus comprising a display screen on which at least two perspectives of an object field are displayed so that in use, the components of the colour spectrum used to display one perspective are, at a given instant, generally complementary to the components of the colour spectrum used to display another perspective whilst, averaged over a period of time, each said perspective is displayed uging a generally representative set of components of the full spectrum of colour relative to the object field to be displayed stereoscopically.

The invention also provides in another embodiment apparatus including a display screen and viewing means adapted to transmit components of the colour spectrum corresponding to one perspective at a given instant to one eye of a viewer and components of the colour spectrum corresponding to a second perspective at that instant to the other eye of the viewer.

For example, a left-perspective view of an object in an object field and a right-perspectlve view may be displayed on a screen, with the right-perspective displayed in red and the left-perspective displayed in complementary blue-green. Rapid switching between the two produces a substantially full spectrum of colour for each perspective. In order to view a stereoscopic image on the screen, viewing means are positioned to intercept rays from the screen. The viewing means enables the left eye to see the left perspective of the object and the right eye to see the right perspective. The colours supplied to each eye at a given instant are complementary to those supplled to the other eye and are switched rapidly in synchronism with the alternating colours of each view on the screen. The rapidity of the switching can be fast enough so that a viewer is not aware of flickering. At one instant the left eye sees the left-perspective in blue-green and the right eye sees the right-perspective in red and at the next instant the situation is reversed, the effect being that of a substantially full-colour stereoscopic image.

Thus, in an embodiment of the invention stereoscopic apparatus comprises a display screen for displaying a first perspective view of an object field having a first set of colour components and a second perspective view of the object field having a second complementary set of colour components, means for rapidly alternating the first and second sets of colour components, and viewing means positioned to intercept rays from the screen and adapted to transmit to a viewer to enable one eye of the viewer to see the first perspective view and the other eye to see the second perspective view and to synchronise the colour components received by each eye with the alternations of the sets of colour components at the display screen thereby, in use, providing the viewer with a stereoscopic image of the object field.

The viewing means may comprise apparatus, placed in the path between the viewer's eyes and the display screen, which includes filter array means, consisting of a repetitive array of transmission filter elements which individually either block or transmit a specific part of the colour spectrum corresponding to the object field to be viewed stereoscopically, and, associated with said filter array means processing array means, consisting of a matching array of polarising elements or lens elements, so that, in use, the light passing via each said filter element and corresponding processing element is provided, at a given instant, with polarisation or directional characteristics specific to the perspective of the object field being displayed by use of the components of the colour spectrum transmitted by said filter element at said given instant.

The system may include light array means, consisting of a repetitive array of light emitting elements each of which emits radiation within a specific part of the colour spectrum relative to an object field to be displayed stereoscopically, so that, in use and at a given instant, each said element only radiates light corresponding to a specific perspective of said object field, and processing array means, consisting of a matching array of polarising elements or lens elements so that, in use, light passing through each said processing element from a corresponding light emitting element is provided with polarisation or directional characteristics specific to the perspective of said object field being displayed by use of the components of the colour spectrum emitted by said light emitting element at said given instant, and electronic an/or mechanical means to maintain the polarisation or directional characteristics specific to a particular perspective of said object field irrespective of the spectral component used to display said perspective at any given instant.

BRIEF DESCRIPTION OF THE DRAWINGS

The invention will now be described by way of example with reference to the accompanying drawings, in which:

FIG. 1 illustrates schematically an arrangement in which a colour video signal for a raster display system is generated;

FIGS. 2A and 2B show respectively in plan and sectional side elevation a device constructed in accordance with one embodiment of the invention and suitable for use by a viewer to view a stereoscopic image displayed on a screen;

FIGS. 4A, 4B, 4C and 4D illustrate a third embodiment of the invention in which the viewer needs only passive polarising glasses; FIG. 4A shows the arrangement in plan, FIG. 4D showing an enlarged section through one side of the spectacles; FIG. 4B shows a small region of the main assembly in horizontal section and FIG. 4C shows this same region in front elevation;

FIG. 6A illustrates diagrammatically and in two halves, two alternative embodiments of viewing spectacles constructed in accordance with the invention;

FIG. 6B shows in horizontal section a small portion of the right eye's assembly of FIG. 6A;

DESCRIPTION OF THE PREFERRED EMBODIMENTS

Figure 3A:
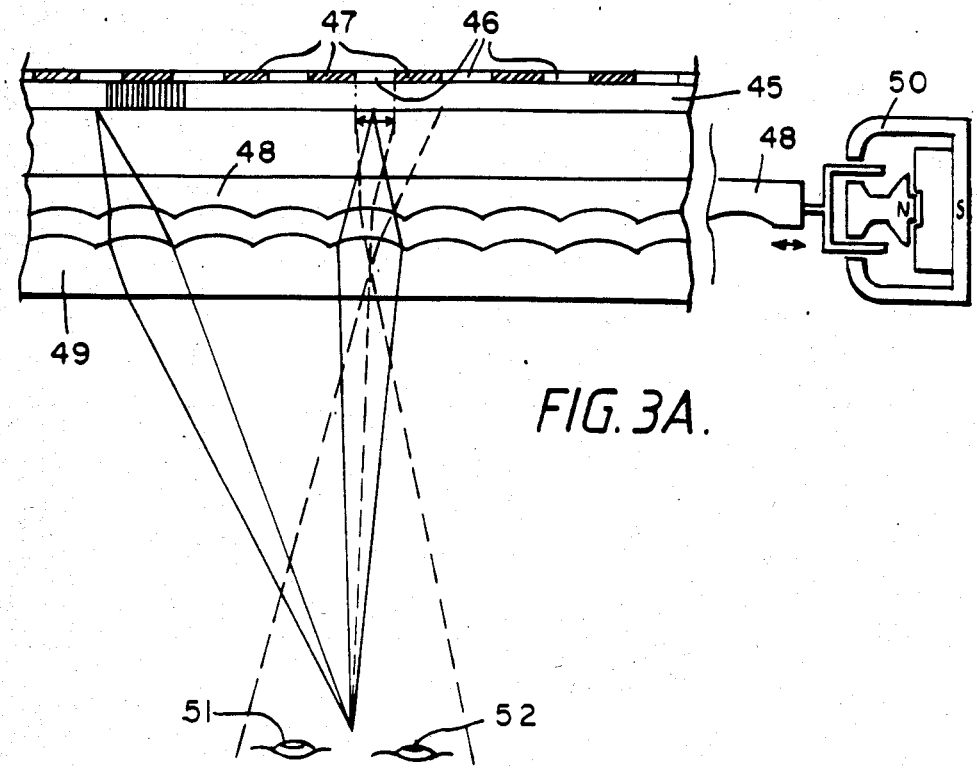
FIGS. 3A and 3B show respectively in horizontal section and front elevation a display screen and viewing means constructed in accordance with a second embodiment of the invention and suitable for viewing a stereoscopic image without the aid of any special viewing device worn by the viewer.

A method for combining two colour video signals, one corresponding to each of two perspectives of an object field and applying the composite signal to a display screen is illustrated with reference to FIG. 1.

An object field 1 with two spaced points A and B is imaged onto two photo cathodes 2 and 3 of the video cameras 4 and 5, respectively. Due to changes in perspective, the images A' and B' of points A and B are further apart on cathode 2 than their counterparts A" and B" on photocathode 3. For a stereoscopic image to be observed, the viewer's left eye 6 must see the image received by camera 5, whereas the right eye 7 must see that received by camera 4.

Each camera has a red, green and blue signal (RGB) and the rasters corresponding to each are synchronised by a timing pulse (frame sync) 8 typically repeated at least 25 (or 30) times per second.

The RGB signals from both cameras are accepted by circuit 9 which is illustrated diagrammatically as a series of AND and OR gates, each of which is capable of transmitting analogue video signals. Gates 10, 13 and 15 are enabled by a gating signal applied to line 16 or gates 11, 12 and 14 are enabled by a gating signal applied to line 17. The transmitted video signal components are passed by gates 18, 19 and 20 respectively to emerge on lines R3, G3 and B3 respectively.

By ensuring that the gating signals applied to lines 16 and 17 are always complementary, the signal appearing on R3, G3 and B3 is either the red signal (R1) from camera 4 together with the green and blue signals (G2 and B2) from camera 5 or, alternatively, the red signal (R2) from camera 5 together with the green and blue signals (G1 and B1) from camera 4.

Typically, the timing of the gating signals corresponds to that of the two interlaced fields of the total video raster, shown as 21 (field A) and 22 (field B). H (High) means that the gates are enabled, whereas L (Low) means that they are blocked. Signals 21 and 22 could, if desired, change at the end of every line scan or on some other timing basis.

The composite video signal (R3, G3, B3) is fed, together with the sync pulse 8 to a colour raster display 23 on which the two fields are shown diagrammatically as solid lines (Field A) and broken lines (Field B) respectively.

The viewer sees the display screen through one of a number of possible viewing means 24, which are typically driven through an amplifier 24A in synchronism with gating signal 22. These ensure that each eye first sees the appropriate information contained in Field A and then, a short time later, there is a switch to Field B. Thus, the left eye 6 first sees the information contained in field A which corresponds to the left perspective (G2 and B2) while the right eye 7 sees the information contained in Field A which corresponds to the right perspective (R1). Then during Field B, the left eye 6 sees R2 and the right eye 7 sees G1 and B1. The rapidity with which the two fields are interchanged ensures that the eyes are not bothered by flickering effects.

One possible viewing means is illustrated with reference to FIG. 2A. A motor 25 drives two substantially identical transparent tubular cylinders 26 and 27. Cylinder 27 is shown in section in FIG. 2B, as seen from the right hand side of the viewing means. The cylinder 27 has two 180° sectors 28 (shown solid) and 29. Sector 28 transmits red and blocks blue and green whereas sector 29 transmits blue and green whilst blocking red. The two cylinders 26 and 27 are rotated in the same direction but when the red sector of cylinder 26 is facing the viewer's left eye 30, the blue-green transmitting sector of cylinder 27 is facing the viewer's right eye 31.

Inside each tubular cylinder there is a solid, stationary, clear transparent semi-cylinder 32, 37. The left and right sides of the viewing means are similar, and the left side only will be described. Cylinder 32 is lying with its longitudinal axis parallel to the axis of rotation of cylinder 26. The outer periphery at the left-hand end is stepped for location against fixed walls $W_1$, $W_2$ of the viewing means. The cylinder transmits red, blue and green light and has a sloped end-surface 33 at its right-hand side cut at 45° to provide an internally reflecting surface. Light from the screen 23 (FIG. 1) enters the cylinder 32 at its left flat end surface 34. End 34 could be curved to increase or decrease the size of the image. Solid cylinder 32 allows eye 30 to view the scene in front of the viewer via lens 35 (also shown in section in the side view), cylinder 26, reflecting surface 33, end surface 34 and via an auxiliary mirror 36 (part shown). Transparent semicylinder 37, corresponding to eye 31, has an equivalent auxiliary mirror 38. Auxiliary mirrors 36 and 38 may typically be folded inwards when not in use.

In order to provide an axis for each rotating hollow cylinder with some rigidity, the spaces adjacent the 45° reflecting surface of the two semicylinders 32, 37 are used to mount additional bearings 39 and 40 which are anchored to the corresponding semi-cylinder at points 41 and 42 (shown in section), outside the optically useful areas of the reflecting surfaces.

Drive electronics 43 mounted adjacent the motor 25 and controlled by the output of amplifier 24A ensures that during Field A, left eye 30 views the screen through the green and blue transmitting sector of cylinder 26, and right eye 31 views the screen through the red sector of cylinder 27. By rotating the tops of the cylinders towards the viewer, transitions between red and blue/green transmission occur from top to bottom of the field of view which makes synchronisation less critical as it follows the direction of the raster scan pattern on the screen. During Field B, the cylinders 26 and 27 are rotated through 180° from their equivalent positions during Field A and each eye views a complementary part of the spectrum.

A recess 44, shown as a broken line in the side view, allows the apparatus to accommodate the viewer's nose, and to be mounted in a natural "spectacle" position.

An alternative to the two rotating tubular cylinders is an arrangement employing two contrarotating discs, one for each eye.

A second embodiment of the invention, in which the viewer does not need to wear any special viewing apparatus to perceive depth is illustrated with reference to FIGS. 3A and 3B.

The screen of a cathode ray tube is provided with alternating bands of phosphor on the inside of a fibre optic face plate 45. Stripes 46 contain blue and green phosphors, whereas stripes 47 are red emitting.

Viewing means, comprising a pair of lenticular screens, shown in section in their upper view, are mounted in front of the image formed on the face plate 45. The concave lens elements of screen 48 act in conjunction with their convex counterparts of screen 49 so that the front of the face plate 45 is at their combined focus. A small lateral movement of screen 48 effected by solenoid 50 causes a shift in the area behind each lenticule seen by each of the viewer's eyes 51 (left) and 52 (right).

Figure 3B:
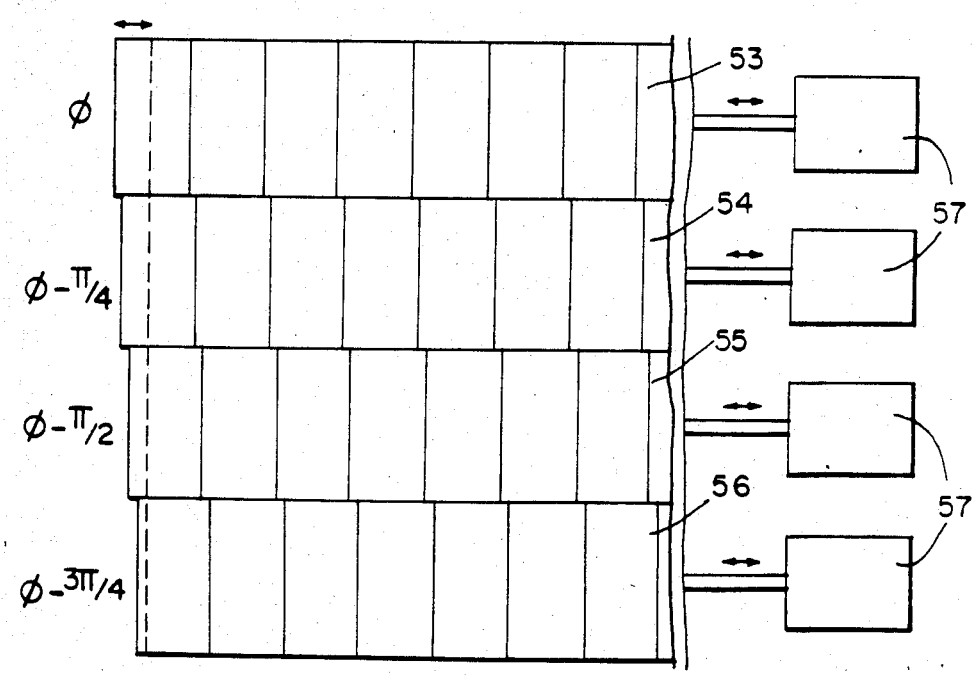

The lenticular screen 48 is split vertically into four sections 53, 54, 55 and 56 as shown in the front view in FIG. 3B, each being independently movable by a corresponding solenoid shown schematically as rectangles 57. Four sinusoidal signals, (not shown) derived from the frame synchronising signals of the cathode ray tube and each 45° out of phase with its nearest neighbour and of a frequency equal to the frame rate of the raster displayed on the cathode ray tube, are applied to the four respective concave lenticular components. The amplitude and phase of motion are such that during Field A, the left eye 51 sees the blue and green regions of the face plate 45, whereas the right eye sees the red regions. As the raster proceeds from the top of the screen (section 53) to the bottom (section 56) the movement of each respective section reaches its maximum displacement either presenting the red or green/blue regions as appropriate to each eye.

There will be several viewing positions which may be adopted by the viewer to perceive correct orthoscopic images, but each is relatively well defined in space. The width of a single lenticule at the screen will depend on the size and resolution of the display. It will typically be in the range 0.3 mm to 1.5 mm.

A further embodiment of the invention which requires no fixed viewing position, and only the wearing of simple polarising spectacles is illustrated with reference to FIG. 4A.

The viewer 58 wears simple polarising spectacles 59, and views a conventional colour video screen 60 through an opto-mechanical viewing device 61. Light from screen 60 passes through entrance window 62 of device 61 which acts as a plane polariser. A specially adapted continuous loop 63 of transparent material is kept in motion by rollers 64, 65, 66 and 67, so that light passes through the loop twice, once through material 68 moving to the left as seen in the figure, and once through material 69 moving to the right. A detail 70 of this arrangement is shown in FIG. 48 and region P is shown in elevation 71, FIG. 4C.

The continuous loop consists of pairs of narrow stripes 72, 73 which transmit either red (72) or blue/green (73). Alternate pairs of red and blue/green stripes are provided with a layer of material 74, such as the nematic twisted crystal used in liquid crystal displays, which rotates the plane of polarisation of the transmitted light by 90°. The remaining pairs located between pairs provided with material 74 transmit without such a rotation. The effect of light passing succsssively through two 90° rotations is equivalent to a zero effect. Men two red stripes coincide for material moving to the left and right, and the corresponding red stripes each have a 90° rotation associated, then all red stripes will transmit without a net rotation. At the same time, all light passing through green/blue stripes will suffer only one 90° rotation, either through the material moving to the left or that moving, to the right. As the loop continues to move, this condition will alternate and the red polarisation will become rotated whereas green/blue will remain unaltered.

The detail 71 in FIG. 4C shows how the stripes of alternating transmission characteristics are tipped to the left (as seen from the viewer's position at the front) on portion 68 (moving to the left) and to the right on portion 69 (moving to the right). Regions of coincidence 75 and 76 are alternatively red or blue/green transmitting and travel in a downward direction as seen from the front. After passing through a quarter wave retardation plate 77, the two states of plane polarisation corresponding to red or blue/green are altered to left or right circular or elliptical polarisation. A movement of left and right moving material of one coloured stripe width will completely switch the direction of circular polarisation corresponding to red or blue/green and is synchronised to correspond to a change from-Field A to Field B.

The downward motion of the region of coincidence is made to correspond to that of the vertical scan rate of the raster by setting the angle of tip correctly.

Each spectacle window 78 consists, as shown in FIG. 4D of a quarter wave plate 79 and appropriate plane polarising element 80 to ensure that each eye receives only left or right circularly/elliptically polarised light. The drive means (not shown) for the loop 63 is controlled by the frame synchronising pulses of the cathode ray tube 60 and by a light transmitter/receiver pair 81 which detects the positiion of the loop 63, to synchronise the motion of loop 63 to the frame rate of the raster.

The operation is as follows. Light from screen 60 becomes plane polarised in one direction in passing through window 62. The polarisation of red light transmitted at a given instant by the loop is unaltered because it suffers two 90° rotations, whilst the polarisation of blue/green light is rotated through 90°. Quarter wave plate 77 causes the red and blue/green light to become oppositely circularly polarised. On reaching the left spectacle window, quarter-wave plate layer 79 of that window converts the two types of circularly polarised light to plane polarised beams, one red and one blue/green, differentiated by 90°. Plane polarising layer 80 transmits one only of the beams so that the left eye sees only, say a red image. For the right eye the situation is reversed as the plane of polarisation of the plane polarising layer 80 is normal to that of the other layer in the left window and a blue/green image can be seen. As the loop moves, the situation reverses so that the left eye sees a blue/green image and the right eye a red one. The loop is synchronised with the frame rate of the raster so that the left eye constantly sees an image from one perspective and the right eye see a different perpsective. Perfect circular polarisation is not necessary and in practice some ellipticity will be present. The requirement is for the quarter wave plates to have matching and opposite characteristics. The width of the stripes of colour filter material will depend as in the lenticular case on the size and resolution of the display. Similar dimensions would be employed.

An alternative and simple variation of the above embodiment of the invention, which requires only the wearing of polarising spectacles, comprises two striped sheets positioned face to face and in close proximity in front of the display screen. The fiirst sheet comprises parallel vertical stripes of filter material arranged alternately to transmit red and blue/green light. The second sheet has matching stripes of polarising material alternate ones of which polarised light from the screen in one direction and the other ones of which polarised light in the orthogonal direction. By moving the two sheets with respect to each other in their own plane in a horizontal direction, the complimeptary spectral components have their polarisation vector switched between fields and always orthogonal one to the other.

The invention as described deals with the display of stereoscopic images on a screen in which different colour components of the same perspective are displayed alternatively and colour components of each of the two perspectives are displayed together.

When the invention is used in a TV transmission environment, it is often convenient to employ PAL, NTSC or SECAM colour encoding techniques. In these systems, R, G and B signals are produced by decoding the luminance and chrominance signals and there is a risk of noise on the received signal causing false colour to be displayed. In. fact, averaging techniques and effects make the eye tolerant to such errors but the stereoscopic display technique proposed by the invention can be substantially degraded by a mixing between the two perspectives.

It is therefore preferable to transmit the entire first perspective in Field A (with all its colour components) and the entire second perspective in Field B. The display of this information, following decoding is arranged by use of storage techniques to be colour sequential for each perspective.

Figure 5:
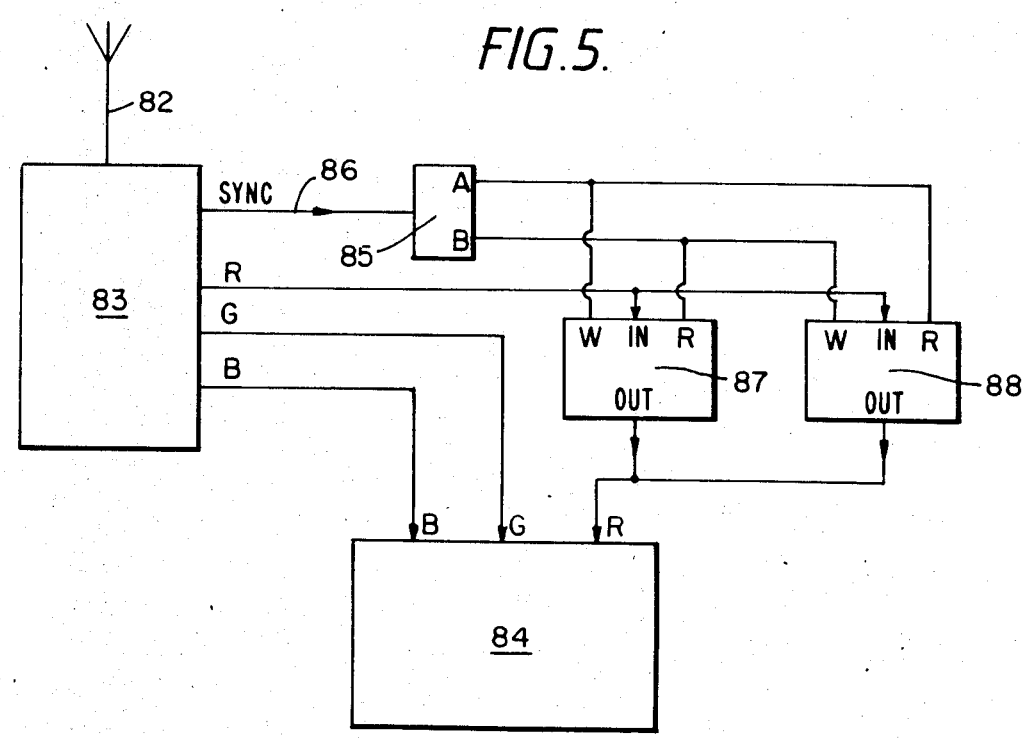
FIG. 5 illustrates a further embodiment of the invention in which a PAL, NTSC or SECAM colour signal is suitably processed for subsequent display in a form in accordance with the invention.

In FIG. 5 an encoded (PAL, SECAM or NTSOC signal is received by aerial 82 and decoded into R, G and B components and a sync pulse by decoder 83. Two of these signals (G and B) are fed directly to the display screen 84. The R component is stored in a video frame (strictly speaking this should be video field) buffer.

In the embodiment shown, two video buffers are employed and may alternately be set to read (store) data or to write (display) data. The outputs of flip flop 85, which is complemented by field sync 86, cause either video buffer 87 or video buffer 88 to be selected for reading or writing.

The outputs of buffers 87 and 88 are ORed together and the combination drives the R input of the display screen.

The result is that, although the signal is transmitted in a full field sequential mode, it is displayed in accordance with the invention in colour sequential manner and a substantially lower level of flicker is achieved.

An altenative to the embodiment illustrated with reference to Figurs 2A is shown in two forms in FIG. 6A. A pair of spectacles may be constructed operating with either electro-optical shutter means or mechanical shutter means. In FIG. 6A both alternatives are illustrated by showing the window for the right eye in its electro-optic form, whereas that for the left eye is shown as an exploded mechanical asssmbly.

In the mechanical case an alternating array of red transmitting stripss 89 and blue/green transmitting stripes 90 are situated immediately behind a slotted lightweight shutter plate 91 which may be rapidly oscillated by an actuator 92 which is fed with electrical signals synchronised to the frame rate of the system. The whole assembly is shown as an exploded view. In practice plate 91 runs in two grooves at the top and bottom of the striped array. For reasons of clarity only the lower groove 91A is shown. During one field the slots are aligned with stripes 89 whilst during the following fiield stripes 90 are allowed to pass light.

In the electro-optic case, a similar result is achieved without mechanical movement. The striped filter material 93 is situated behind a transparent sheet electrode 94 which forms part of a sandwich comprising two other electrodes 95 and 96 which are electrically isolated from each other and each of which has a series of fingers 95A and 96A respectively. The fingers 95A are positioned in front of all the stripes of one colour of filter material and the fingers 95B are positioned in front of the other stripes of colour filter material. Sandwiched between the electrode 94 and the electrodes 95, 96 is a layer of liquid crystal material 97. To complete the assembly it is normal to use polarising material on both sides of the total sandwich. FIG. 6B shows these elements in section as layers 93A and 93B. For clarity these are not shown in the main figure. The plane of polarisation of light passing through electrodes 94 and 95 will be altered by the voltage between them. The same is true for light passing through electrodes 94 and 96. Thus by applying appropriately phased signals to the electrodes 95 and 95 red light may be transmitted whilst green and blue is blocked and vice versa. In order to be unobtrusive to the eye and to minimise diffraction effects the slots or stripes in both mechanical and electro-optic embodiments would typically have a width of between 0.4 m to 1 m. In operation of the device of FIGS. 6A and 6B, the signals controlling the mechanical or electro-optical shutter means are derived from signals produced in synchronism with the production of the frames or fields of the image.

Although liquid crystals employing a longitudinal field effect have been illustrated, other forms of electro-optic structure may be used. A good example of such an alternative is lanthanum doped lead Zirconate Titanate (PLZT) which, given a transverse field between adjacent narrow electrodes, will provide similar results. Its advantage compared to liquid crystal is its speed, but at a price premium.

Figure 7A:
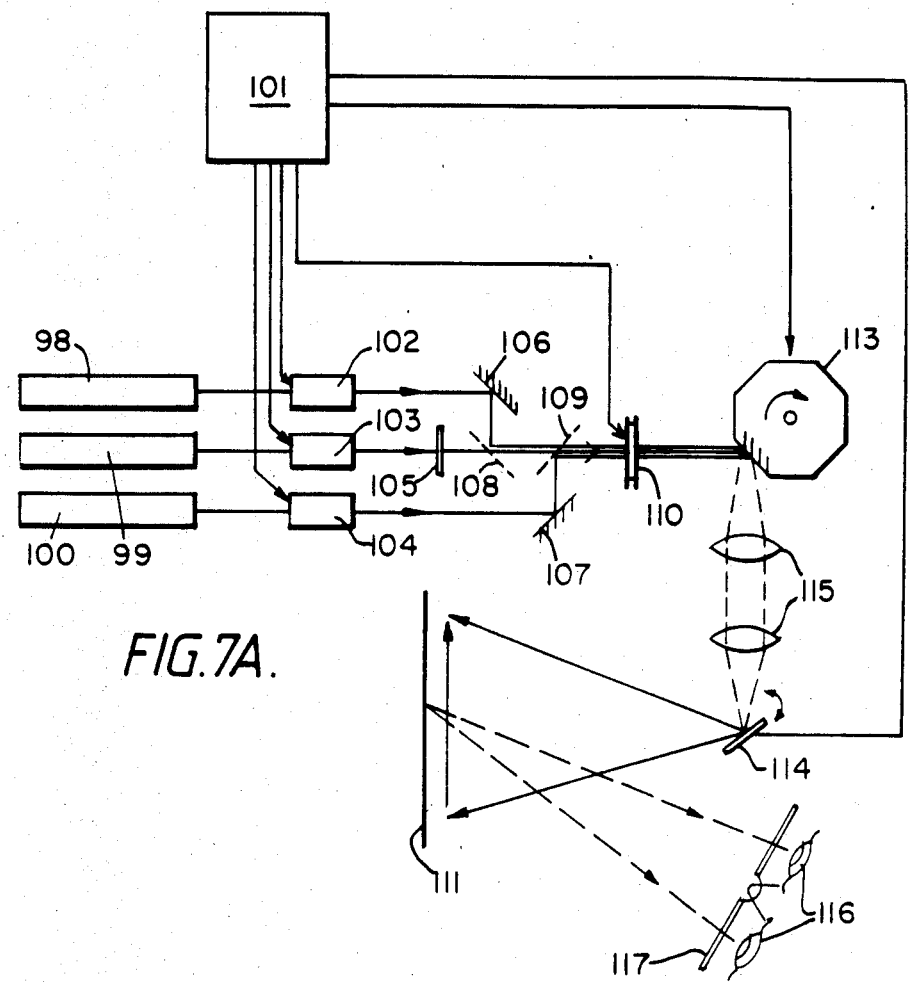
FIG. 7A illustrates schematically a laser raster display for displaying stereoscopic images in accordance with the invention.

The embodiments described so far relate to special screens and/or viewing means adapted to switch the correct components of the displayed image to each of the viewer's eyes. The embodiment illustrated with reference to FIG. 4 required the viewer to wear simple polarising glasses, whilst a colour selective polarising system is placed between the viewer and a conventional television screen. In systems where the TV raster is generated by scanning a beam of light or on a small format, following which it is projected optically onto a large screen, polarising elements switchable between alternate time periods may be placed in the light path before this reaches the display screen. One example of such a system uses a laser light source for each of the the three primary colours, red, green, and blue. This is illustrated with reference to FIGS. 7A and 7B.

Three laser sources 98 (red), 99 (green) and 100 (blue) are used. In practice these may be derived from one or two laser systems. For example, an Argon laser typically provides green and blue wavelengths. Each laser is assumed to have a polarised output which mey be modulated independently. A computer 101 provides drive signals to acousto-optic modulators 102, 103 and 104. The green output beam has its plane of polarisation twisted by 90° with respect to the red and blue beams. In this embodiment this is accomplished by a half wave plate 105. The three primary colours are combined into one composite beam by mirrors 106 and 107 and two dichroic elements 108 and 109. An electro-optic cell 110 in the path of the beam switches the polarisation axes of all components at the beginning of each field under the control of computer 101. Thus, if in Field A the red and blue components are vertically polarised whilst green has horizontal polarisation, cell 110 causes the inverse to be true in Field B.

Figure 7B:
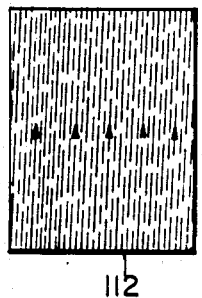
FIG. 7B shows the screen of FIG. 7A with displayed raster in front elevation.

The composite beam is scanned in the form of a raster on screen 111 shown in FIG. 7B in front elevation 112. This is achieved by a spinning polygonal mirror 113 and an oscillating mirror 114 each of which receives signals from computer 101. Relay optics 115 ensures maximum efficiency in this process. The viewer 116 observes screen 111 through polarised spectacles 117, each window of which selects orthogonally polarised components.

Thus, one eye observes red and blue whilst the other observes green and this situation is reversed during the following field.

It will be apparent that different arrangements are possible. For instance cell 110 may equally well have been replaced by three elements acting in parallel and placed in the component beams before their recombination. Also, an electro-mechanical polarisation switch could replace cell 110. In this example, unlike previous embodiments, the two spectral components switched between fields to each eye are the red and blue on the one hand and the green on the other. It will also be apparent that computer 101 could in practice be a video signal receiver or a device such as a video cassette recorder.

Figure 8:
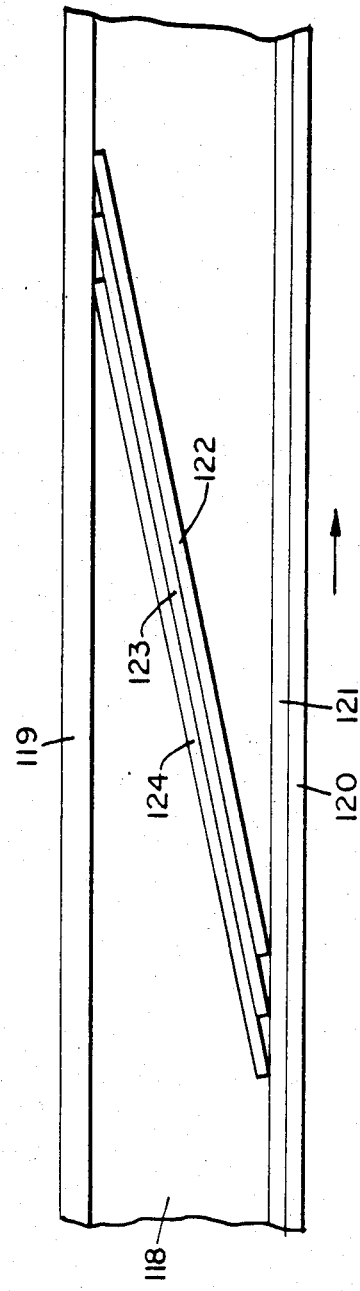
FIG. 8 illustrates diagramatically a video recording produced in accordance with the invention.

A video recording for displaying stereoscopic images in accordance with the invention is illustrated witih reference to FIG. 8. This shows in diagrammatic form a section of a video tape 118 on which magnetic information has been recorded. Tape control information is contained in a stripe 119, whereas audio information is recorded on tracks 120 and 121. Video signals are recorded on a diagonal format, three such tracks being illustrated. Each diagonally recorded track comprises video signals for a single field of the image. As the tape moves, successive tracks are recorded. Thus, track 122 contains the red and blue spectral components for the left eye together with the green component for the right eye and comprises the Field A signal. Track 123 contains the red and blue components for the right eye together with the green component for the left eye and comprises the Field B signal. Track 124 comprises the first field of the next video frame.

It will be clear that other forms of record are possible. The data may be recorded on a video disc or in digitial form in a ROM (Read Only Memory) or on a computer tape or disc. The format in which it is recorded may be tailored to be suitable for use by a computer program for displaying stereoscopic images. The record may form part of a video game.

The record need not be on a magnetic medium but may comprise photographic film.

It will be apparent that many variations to the various embodiments illustrated are possible. Lenticular screens may be used in conjunction with conventional TV screens or adapted screens may be combined with polarising arrangements as described above. The principles of tihe inventiion may be applied to cinemetography, in which successive frames are treated in the way that alternate fields are in the examples given. It will also be apparent that switching from one part of the spectrum to another need not be done at any particular rate, providing the viewing mechanism does so on a synchronous basis. In this case, line frequency may replace alternate fields. Furthermore, the division of the spectrum need not be as described and otiher permutations are permissible.

As a further embodiment of the invention, the arrangement shown in FIG. 3 may be modified for use with a conventional television screen. In this modification, the elements indicated by reference numbers 46 and 47 would be constitiuted by a filter having stiripes alternate ones of which pass one of the spectral component and the others of which pass the other spectral component. The fibre-optic face plate may be omitted. The device modified in this way may be placed close to the television screen and stereoscopic images viewed provided the images produced on the television screen are in accordance with the teachings of the present invention. As a further modification to this arrangement, it would be possible to maintain the lenticular lenses stationary and to move the striped filter instead. Further, both in this arrangement and in the arrangement shown in FIG. 3, it would be possible to employ just a single lenticular lens sheet but in this case a larger amplitiude of movement would be required.

In fact, the system is not limited to the display of colour images, and may be used to provide a substantially flicker free display of a black and white picture by feeding the same black and white video signal to the R, G and B inputs of a colour display system. Each perspective would be displayed in a subset of these colours in any given field.

What is claimed is:

1. Apparatus for viewing a stereoscopic image, having first and second spectral components, from first and second perspectives in a viewer's left and right eyes respectively comprising:

first filter means for said left eye comprising first and second spectral filter means corresponding to said first and second spectral components of said image;

second filter means for said right eye comprising first and second spectral filter means corresponding to said first and second spectral components of said image;

alternating means for causing said first and second spectral filter means of each of said first and second filter means to be operable alternately so that said first and second filter means are in anti-phase; and synchronizing means for synchronizing operation of said first and second filter means with said first and second spectral components so that each one of said right and left eyes only receives spectral components corresponding to the perspectives of said image to be viewed thereby.

2. A recording member for forming a stereoscopic image having a plurality of spectral components and which is viewable by supplying to a viewer's left and right eyes respectively light representing first and second perspectives of said image, said recording member including a plurality of first recording locations containing representations of substantially only the first spectral component of light representing said first perspective and the second spectral component of light representing the second perspective, and a plurality of second recording locations containing representations of substantially only the second spectral component of light representing the first perspective and the first spectral component of light representing the second perspective, said first and second recording locations alternating with each other, whereby reproduction from said first and second recording locations in succession provides alternating spectral components for each of said first and second perspectives.

3. A device according to claim 1, wherein the first and second spectral filter means for each eye comprise first and second filters and wherein said alternating means comprises means for moving said filters between operative and inoperative positions.

4. A device according to claim 3, wherein said first and second filter means are mounted for rotational movement between said operative and inoperatiive positions.

5. A device according to claim 1, wherein each of said first and second filter means comprises a member having a plurality of stripes alternate ones of which pass the first spectral component and the others of which pass the second spectral component, and shutter means, controlled by said synchronizing means, to permit light to be transmitted either through said alternate stripes or through said other stripes.

* * * * *

UNITED STATES PATENT AND TRADEMARK OFFICE
CERTIFICATE OF CORRECTION

PATENT NO. : 4,692,792

DATED : September 8, 1987

INVENTOR(S) : Graham S. B. Street

It is certified that error appears in the above-identified patent and that said Letters Patent is hereby corrected as shown below:

Column 1, line 6, "field" should read --filed--;

Column 2, line 37, "supplled" should read --supplied--;

Column 6, line 45, "48" should read --4B--;

line 57, "Men" should read --When--;

Column 8, line 25, "NTSOC " should read --NTSC)--;

line 44, "altenative" should read --alternative--;

line 45, "Figurs" should read --Figure--;

line 51, "asssmbly" should read --assembly--;

line 53, "stripss" should read --stripes--;

Column 9, line 16, the second occurrence of "95" should read --96--;

line 21, "0.4 m to 1 m" should read --0.4 mm to 1 mm--;

line 47, the second occurrence of the word "the" should be deleted;

UNITED STATES PATENT AND TRADEMARK OFFICE
CERTIFICATE OF CORRECTION

PATENT NO. : 4,692,792

DATED : September 8, 1987

INVENTOR(S) : Graham S. B. Street

It is certified that error appears in the above-identified patent and that said Letters Patent is hereby corrected as shown below:

Column 10, line 26, "witih" should read --with--; and line 57, "tihe inventiion" should read --the invention--.

Signed and Sealed this

First Day of March, 1988

Attest:

DONALD J. QUIGG

Attesting Officer

Commissioner of Patents and Trademarks